(12) United States Patent
Miller

(10) Patent No.: US 7,039,680 B2
(45) Date of Patent: May 2, 2006

(54) APPARATUS AND METHOD FOR TIMEOUT-FREE WAITING FOR AN ORDERED MESSAGE IN A CLUSTERED COMPUTING ENVIRONMENT

(75) Inventor: Robert Miller, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 864 days.

(21) Appl. No.: 09/780,196

(22) Filed: Feb. 9, 2001

(65) Prior Publication Data

US 2001/0013057 A1    Aug. 9, 2001

Related U.S. Application Data

(63) Continuation-in-part of application No. 09/438,207, filed on Nov. 12, 1999, which is a continuation-in-part of application No. 09/421,585, filed on Oct. 20, 1999.

(51) Int. Cl.
G06F 15/16 (2006.01)
G06F 11/00 (2006.01)

(52) U.S. Cl. .................................. 709/207; 370/236
(58) Field of Classification Search ................ 709/217, 709/207, 206, 237, 235, 232, 234, 229, 106, 709/100, 102; 370/229, 230, 236; 710/36
See application file for complete search history.

(56) References Cited

U.S. PATENT DOCUMENTS 5,029,124 A    7/1991  Leahy et al.

(Continued)

Primary Examiner—Ario Etienne
Assistant Examiner—Uzma Alam
(74) Attorney, Agent, or Firm—Martin & Associates, LLC; Derek P. Martin (57) ABSTRACT

A clustered computer system includes multiple computer systems (or nodes) on a network that can become members of a group to work on a particular task, referred to herein as a protocol. A protocol is defined so that each phase of the protocol is terminated with an acknowledge (ACK) round. Within each phase of the protocol, a node cannot both send and receive a data message. The protocol includes an ACK round that provides a relative time event that indicates when a data message should be received. If the data message is not received when the ACK round occurs, the receiver knows that the sender did not send it, and can request that the sender re-send the missing data message. In a first embodiment, referred to herein as the "post-ACK" case, the receipt of expected data messages is checked after the ACK round occurs. In a second embodiment, referred to herein as the "pre-ACK" case, the receipt of expected data messages is checked before the ACK round occurs. In both cases, when the receiver sees the ACK round, it knows that the sender sent the data message. If the data message was not received by the receiver, it knows to request that the sender re-send the data message. In this manner the preferred embodiments provide an architected way for sending and receiving data messages without using timers in a clustered computing environment that includes ordered messages. As a result, the preferred embodiments may be readily implemented on computer clusters that include nodes on a wide area network (WAN) that have a large variability in their response times.

20 Claims, 8 Drawing Sheets

U.S. PATENT DOCUMENTS

| | | |
|---|---|---|
| 5,432,932 A | 7/1995 | Chen et al. |
| 5,692,193 A * | 11/1997 | Jagannathan et al. ........ 718/106 |
| 5,727,210 A * | 3/1998 | Dwork et al. ................ 718/104 |
| 5,748,882 A | 5/1998 | Huang |
| 5,787,249 A | 7/1998 | Badovinatz et al. |
| 6,108,699 A * | 8/2000 | Moiin ......................... 709/221 |
| 6,216,150 B1 | 4/2001 | Badovinatz et al. |
| 6,247,059 B1 * | 6/2001 | Johnson et al. .............. 709/237 |
| 6,430,591 B1 | 8/2002 | Goddard |
| 6,487,580 B1 | 11/2002 | Bobak et al. |

\* cited by examiner

APPARATUS AND METHOD FOR TIMEOUT-FREE WAITING FOR AN ORDERED MESSAGE IN A CLUSTERED COMPUTING ENVIRONMENT

PARENT APPLICATION

This patent application is a continuation-in-part of "APPARATUS AND METHOD FOR PROCESSING A TASK IN A CLUSTERED COMPUTING ENVIRONMENT", Ser. No. 09/438,207, filed on Nov. 12, 1999, which is a continuation-in-part of "APPARATUS AND METHOD FOR PASSIVELY MONITORING LIVENESS OF JOBS IN A CLUSTERED COMPUTING ENVIRONMENT", Ser. No. 09/421,585, filed on Oct. 20, 1999, which are both incorporated herein by reference.

BACKGROUND OF THE INVENTION

1. Technical Field

This invention generally relates to data processing, and more specifically relates to the sharing of tasks between computers on a network.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With multiple computers hooked together on a network, it soon became apparent that networked computers could be used to complete tasks by delegating different portions of the task to different computers on the network, which can then process their respective portions in parallel. In one specific configuration for shared computing on a network, the concept of a computer "cluster" has been used to define groups of computer systems on the network that can work in parallel on different portions of a task.

One type of computer cluster uses the concept of ordered messages to share portions of tasks. In an ordered message system, the order of messages sent by one node is guaranteed to appear at all other nodes in the same order as the messages were sent. Note that the order of messages from different nodes is not guaranteed, only that the order of messages from a particular sender is guaranteed. For example, messages from two different senders may be interleaved so long as the order of messages from each sender is maintained.

Processing tasks in a computer cluster that uses ordered messages requires that each node process the same task (known as a "protocol"). When a point in the protocol is reached where one node requires a data message from another node, the node that expects the data message (the "receiver") typically configures a timer to wait on the expected data message. If the expected data message is received before the timer times out, the data message is processed normally. If the timer times out before the expected data message is received, an error has occurred. In the prior art, great effort has been expended on defining suitable timeout values that will cause the timer to time out when an error occurs but not under normal operating conditions. Tweaking the timeout values may provide acceptable results for a local area network (LAN), where the time between sending and receiving a message varies within known limits. However, when a computer cluster includes nodes that are coupled via a wide area network (WAN), the tuning of the timeout values becomes very problematic. As the load on the individual LANs coupled to the WAN varies, the time between sending and receiving a message can vary greatly. In this environment, the node that is expecting a data message has to decide what action to take when the timer times out. If the timer times out due to abnormally high network traffic, but the expected data message was actually sent, how does the receiver handle the data message that is received after the timer times out? When the timer times out, the receiver has no idea whether the expected data message was sent by the sender or not. One way to handle a timeout is for the receiver to request that the sender re-send the data message. However, if the original data message was sent but arrives after the timer times out, how does the receiver know whether the data message is the original message or the re-sent message? And if it's the original message, how does the receiver handle the re-sent message when it is received? Providing a timeout timer for a receiver that expects a data message thus presents many problems that are not adequately addressed by the prior art. Without a mechanism for providing a way to process messages without timeout timers in a clustered computing system that uses ordered messages, the computer industry will continue to suffer from inadequate and inefficient ways of handling a timeout event, which will cause inefficiencies in the clustered computing system.

DISCLOSURE OF INVENTION

According to the preferred embodiments, a clustered computer system includes multiple computer systems (or nodes) on a network that can become members of a group to work on a particular task, referred to herein as a protocol. A protocol is defined so that each phase of the protocol is terminated with an acknowledge (ACK) round. Within each phase of the protocol, a node cannot both send and receive a data message. The protocol includes an ACK round that provides a relative time event that indicates when a data message should be received. If the data message is not received when the ACK round occurs, the receiver knows that the sender did not send it, and can request that the sender re-send the missing data message. In a first embodiment, referred to herein as the "post-ACK" case, the receipt of expected data messages is checked after the ACK round occurs. In a second embodiment, referred to herein as the "pre-ACK" case, the receipt of expected data messages is checked before the ACK round occurs. In both cases, when the receiver sees the ACK round, it knows that the sender sent the data message. If the data message was not received by the receiver, it knows to request that the sender re-send the data message. In this manner the preferred embodiments provide an architected way for sending and receiving data messages without using timers in a clustered computing environment that includes ordered messages. As a result, the preferred embodiments may be readily implemented on computer clusters that include nodes on a wide area network (WAN) that have a large variability in their response times.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through sharing portions of tasks on computers that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies. TCP/IP provides reliable exchange of network messages. Thus, if a message gets scrambled in transit, the receiver and sender will communicate to correct the error by the sender re-sending the message.

Computer Clusters

The prior art recognized the benefit of having groups of computer systems work on different pieces of a problem. The concept of "clusters" of computers evolved to include a predefined group of networked computers that can share portions of a larger task. One specific implementation of a cluster uses ordered messages for communicating between the computers in a cluster. In an ordered message system, each message is communicated to all nodes, and the order of messages is enforced so that all nodes see the messages from each sender in the same order.

Figure 1:
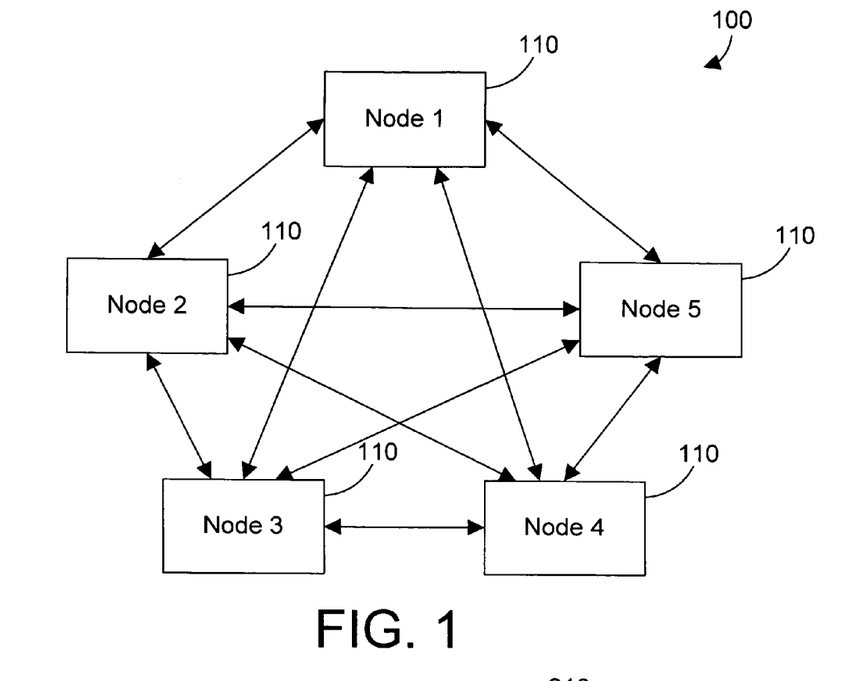
FIG. 1 is a block diagram of computer systems that may intercommunicate on a network.
Figure 2:
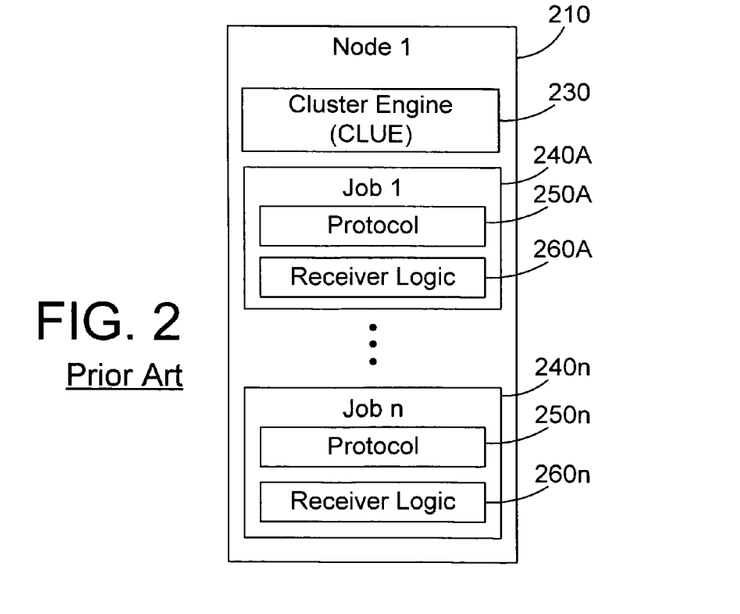
FIG. 2 is a block diagram of a prior art cluster node.

Referring to FIG. 1, a simple cluster 100 of five computer systems (or "nodes") 110 is shown. The connections between these nodes represents a logical connection, and the physical connections can vary within the scope of the preferred embodiments so long as the nodes in the cluster can logically communicate with each other. Within a cluster, one or more "groups" may be defined, which correspond to logical groupings of nodes that cooperate to accomplish some task. Each node in a group is said to be a "member" of that group. As shown in FIG. 2, each node 210 in a prior art cluster includes a cluster engine 230 (referred to herein as CLUE), and one or more jobs 240 (such as jobs 240A and 240n in FIG. 2). Each job 240 executes a protocol 250 that defines the shared task that is being delegated to the members of the group, and executes receiver logic 260 that indicate how to process incoming messages from CLUE 230. In the prior art, receiver logic 260 includes one or more timers that each provide a timeout period during which an expected data message should be received. If the expected data message is not received within the timer period, the timeout timer will fire to indicate an error condition.

CLUE 230 is a software process that enforces ordered messages between nodes in a cluster. All messages by any member of the group are communicated to the node's local CLUE 230, which then communicates the message to all other members of the group. When a job 240 wants to be part of a group, it registers with CLUE 230 as a member of that group. This registration causes CLUE to generate a membership change message to other members of the group to inform the other members of the new addition to the group. In similar fashion, when a job 240 no longer wants to become a member of the group, it unregisters with CLUE 230, which also causes a corresponding membership change message to inform the remaining members of the group that a member has been deleted from the group. When CLUE 230 receives a message from its member that is intended for the group, CLUE 230 sends the message to all registered members.

Figure 3:
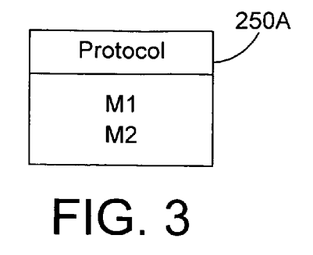
FIG. 3 is a block diagram of a protocol that could be processed by the prior art cluster node of FIG. 2.
Figure 4:
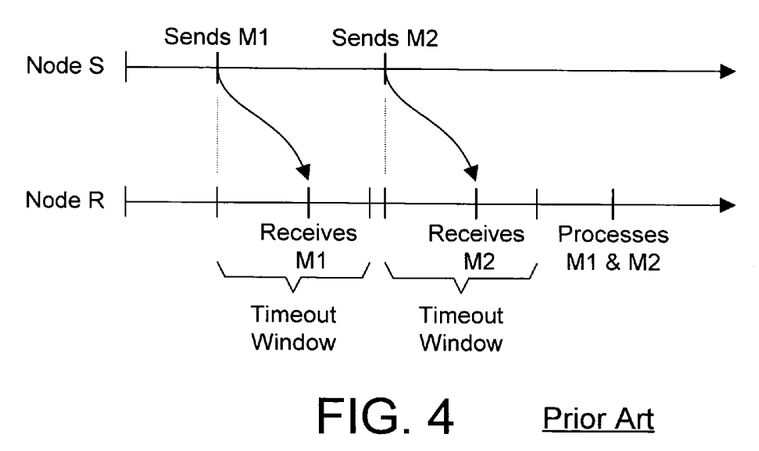
FIG. 4 is a timing diagram that shows the timing for sending and receiving the messages in the protocol of FIG. 3 when using receiver timers as is known in the prior art.

One example of a protocol 250A is shown in FIG. 3. A protocol simply lists work items that need to be performed to accomplish the overall task the group is working on. In the protocol 250A of FIG. 3, a message M1 is sent, followed by a message M2. Timelines for a sender node S and a receiver node R are shown in FIG. 4 to illustrate how the protocol 250A of FIG. 3 is processed in the prior art according to receiver logic 260 that uses timers. We assume that node S is the sender for messages M1 and M2, and that node R is the receiver node that is supposed to process M1 and M2. Node S first sends M1. Node R is expecting M1 because it is processing the same protocol 250A that is being processed by node S. As a result, when node R expects M1, it sets up a timer with a timeout value that defines a timeout window as shown in FIG. 4. In normal operation, where the time variance between sending and receiving a message is known and relatively constant, the timeout window can be selected so that most messages that are actually sent will be received before the timer times out. FIG. 4 thus shows nodes S and R that operate normally in the prior art method that uses timeout timers for node R. Node S sends M1. M1 is received by R before the timer times out (i.e., within the timeout window), so R then awaits M2. S sends M2, which is again received by R before the timer times out. Node R then processes M1 and M2.

Figure 5:
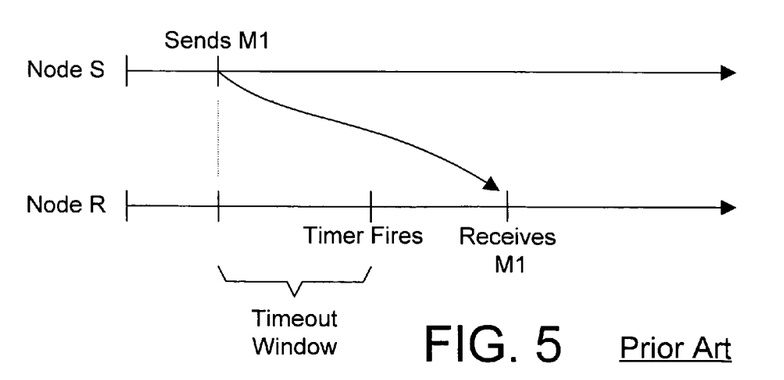
FIG. 5 is a timing diagram that shows a receiver timer firing as is known in the prior art in response to a delayed reception of message M1 in the protocol of FIG. 3.

FIG. 5 illustrates the timeline for processing the protocol 250A of FIG. 3 when the timer times out. We assume that node S sends M1. However, due to network congestion, the timer times out (i.e., the timer fires) before M1 is received by R. In this case, R must decide how to handle the timeout. R has no idea whether S never sent the message, or whether the message is just late in arriving. Let's assume that R sees the timer fire, and requests that S re-send M1. R then receives M1 after the timer fires. How does R know whether this M1 is the original M1, or the re-sent M1? This problem creates a dilemma for node R. As computer clusters are configured that include nodes on wide area networks (WANs), the problem of trying to tune timer values becomes an almost impossible task, and the problem of determining how to handle timeouts greatly increases the complexity of processing a task with this type of computer cluster.

2. Detailed Description

According to preferred embodiments of the present invention, an apparatus and method process a task (or protocol) in a clustered computing environment that uses ordered messages without using timers while waiting for incoming data messages. Each protocol is defined so that it has an acknowledge (ACK) round at the end of each phase, and so that a node in the cluster cannot both send and receive a data message during the same phase of the protocol. By including an ACK round, the group members will be able to affirmatively determine whether it received an expected data message or not. If the message was received, it is processed normally. If the message was not received, the receiver can request that the sender re-send the message. In this manner no timers are required. Instead, the ACK round serves as a time benchmark for measuring when expected data messages should be received if they were sent by the sender.

Figure 6:
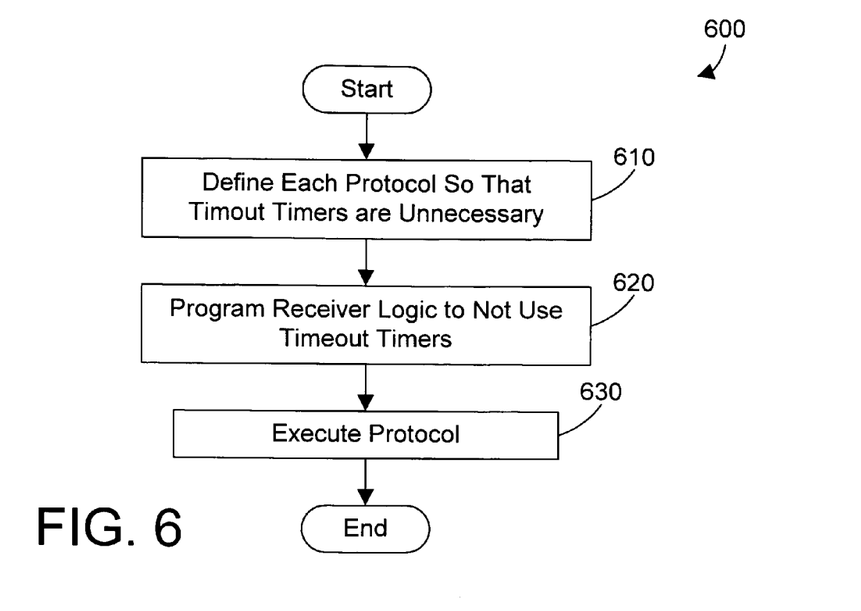
FIG. 6 is a flow diagram of a method for providing message exchange without using timers in a clustered computing environment that uses ordered messages.
Figure 7:
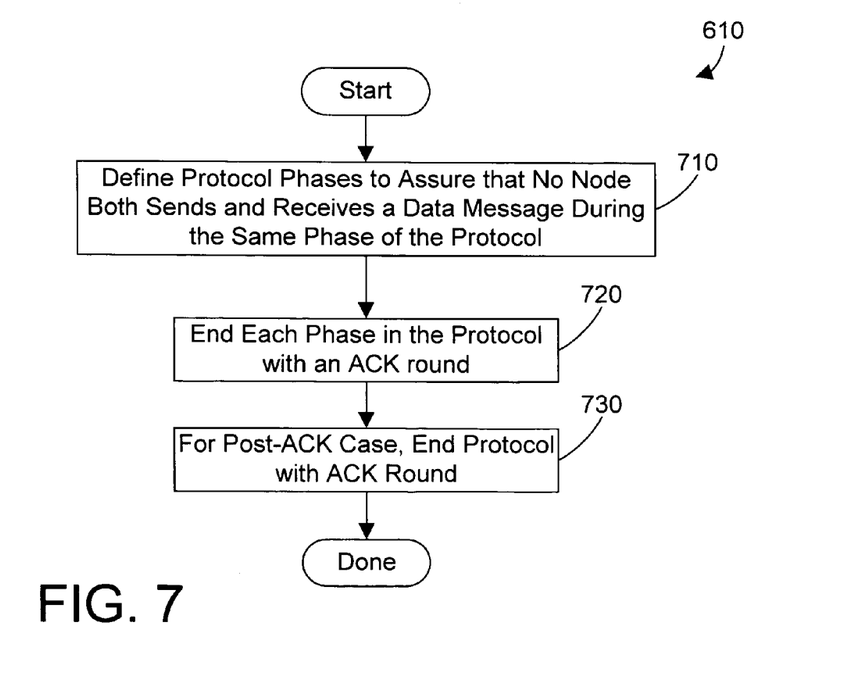
FIG. 7 is a flow diagram of one sample implementation of step 610 of FIG. 6.

Referring to FIG. 6, a method 600 in accordance with the preferred embodiments begins by defining each protocol so that timeout timers are unnecessary (step 610). One example of a specific implementation of step 610 is shown in FIG. 7, which is discussed in more detail below. Once the protocol is defined so that timeout timers are unnecessary, the receiver logic for the protocol may be programmed to not user timeout timers (step 620). In the preferred embodiments, it is the combination of the constraints on the protocol definition and the programmed receiver logic that provide the capability of receiving ordered messages without using timers. Next, the protocol may be executed by a computer cluster (step 630), which results in timeout-free waiting for a data message in an ordered message environment.

One specific implementation of step 610 in FIG. 6 is shown as a method 610 in FIG. 7. A protocol must have certain characteristics to support timeout-free waiting for data messages in an ordered message environment. First, the protocol is defined in phases, and each phase is defined so that no node can both send and receive a data message during the same phase of the protocol (step 710). The phases of a protocol are discussed below with reference to FIG. 8. The requirement that no node may both send and receive a data message during the same phase of a protocol is required to avoid a potential deadlock scenario that may occur if a sender is waiting for a message from a receiver, and the receiver is also waiting for a message from the sender.

Each phase of the protocol is ended with an ACK round (step 720). The ACK round provides a synchronization point for communicating the successful receipt or processing of messages. Finally, for the post-ACK case, the protocol is ended with an additional ACK round (step 730). Note that the pre-ACK case does not require that the protocol end with an additional ACK round.

Defining a protocol as described in FIG. 7 assures that the ACK round that ends a phase in the protocol will serve as a time benchmark for the receiver that expects a data message. Rather than setting a timeout timer, as is done in the prior art, the ACK round serves as a signal that the sender believes the data message has been sent. If the receiver has not received the message from the sender, this must be due to a logic error in the sender, and the receiver knows to request that the sender re-send the message. The method of the preferred embodiments thus avoids the ambiguity that exists in the prior art from having a timeout timer fire, and not knowing whether the data message is late in coming or is never coming. As a result, when the ACK round occurs, the receiver knows that if the expected data message has not been received, it is not coming.

Figure 8:
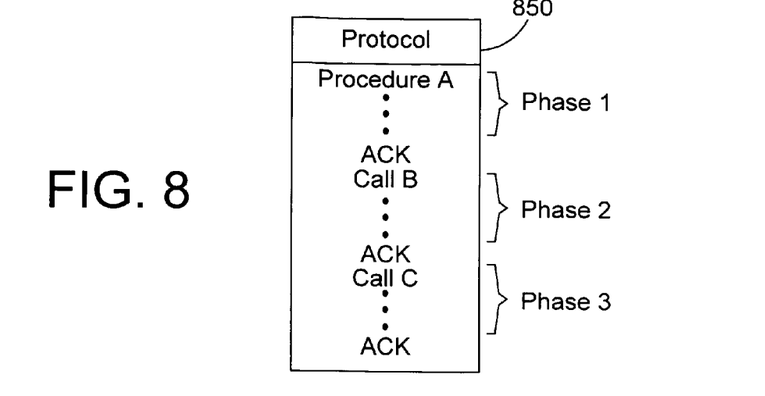
FIG. 8 is a block diagram of one sample protocol in accordance with the preferred embodiments showing the division of the protocol into phases that are each terminated by an ACK round.

In the preferred embodiments, each phase of a protocol is implemented in a different procedure (or code portion). Thus, as shown in FIG. 8 for protocol 850 in accordance with the preferred embodiments, procedure A executes phase 1, followed by an ACK round. After the ACK round, procedure A calls procedure B, which executes phase 2, followed by another ACK round. After the second ACK round, procedure B calls procedure C, which executes phase 3, followed by another ACK round. After the third ACK round, procedure C continues processing the protocol to completion. FIG. 8 thus graphically shows a protocol 850 that has separate phases that are each ended with an ACK round (as required by step 720 of FIG. 7). Note that the protocol 850 of FIG. 8 does not include an additional ACK round at the end, which means that the protocol 850 of FIG. 8 could be a protocol for the pre-ACK case, and could be a protocol for the post-ACK case if the data message is received before the ACK round that follows Phase 3 of the protocol. If the data message might be received after the ACK round that follows Phase 3 of the protocol, an additional ACK round would be needed to make the protocol work in the post-ACK case.

The nesting of phases as shown by way of example in FIG. 8 makes an "undo" function easier to perform. If a group member needs to "undo" its work on a protocol for some reason (such as a negative acknowledge (NACK) message or a membership change message from another group member), each phase only has to undo what it did, without concern for what happened outside of it. This allows simpler code that is easier to follow, because what a phase does, it also undoes.

Figure 9:
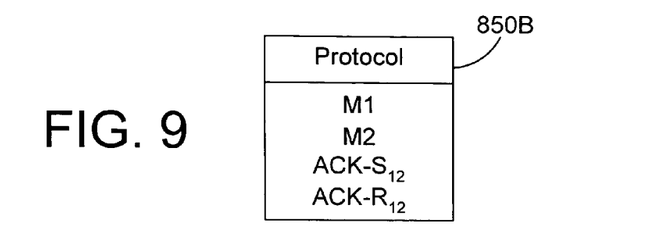
FIG. 9 is a block diagram of a sample protocol that illustrates the post-ACK embodiment that includes an ACK round (ACK-$S_{12}$) that allows the receiver to received data messages M1 and M2 without using a timer.
Figure 10:
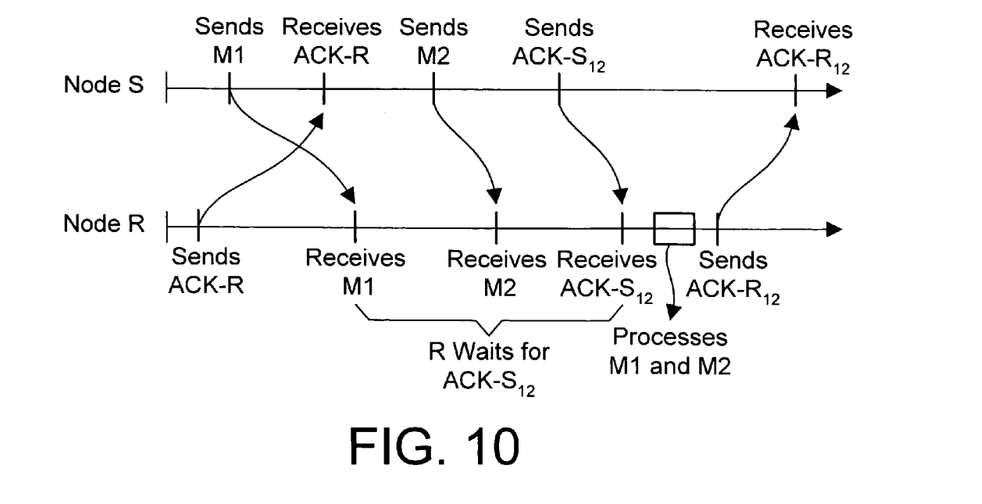
FIG. 10 is a timing diagram showing one way to process the protocol of FIG. 9 in the post-ACK case in accordance with the preferred embodiments.
Figure 11:
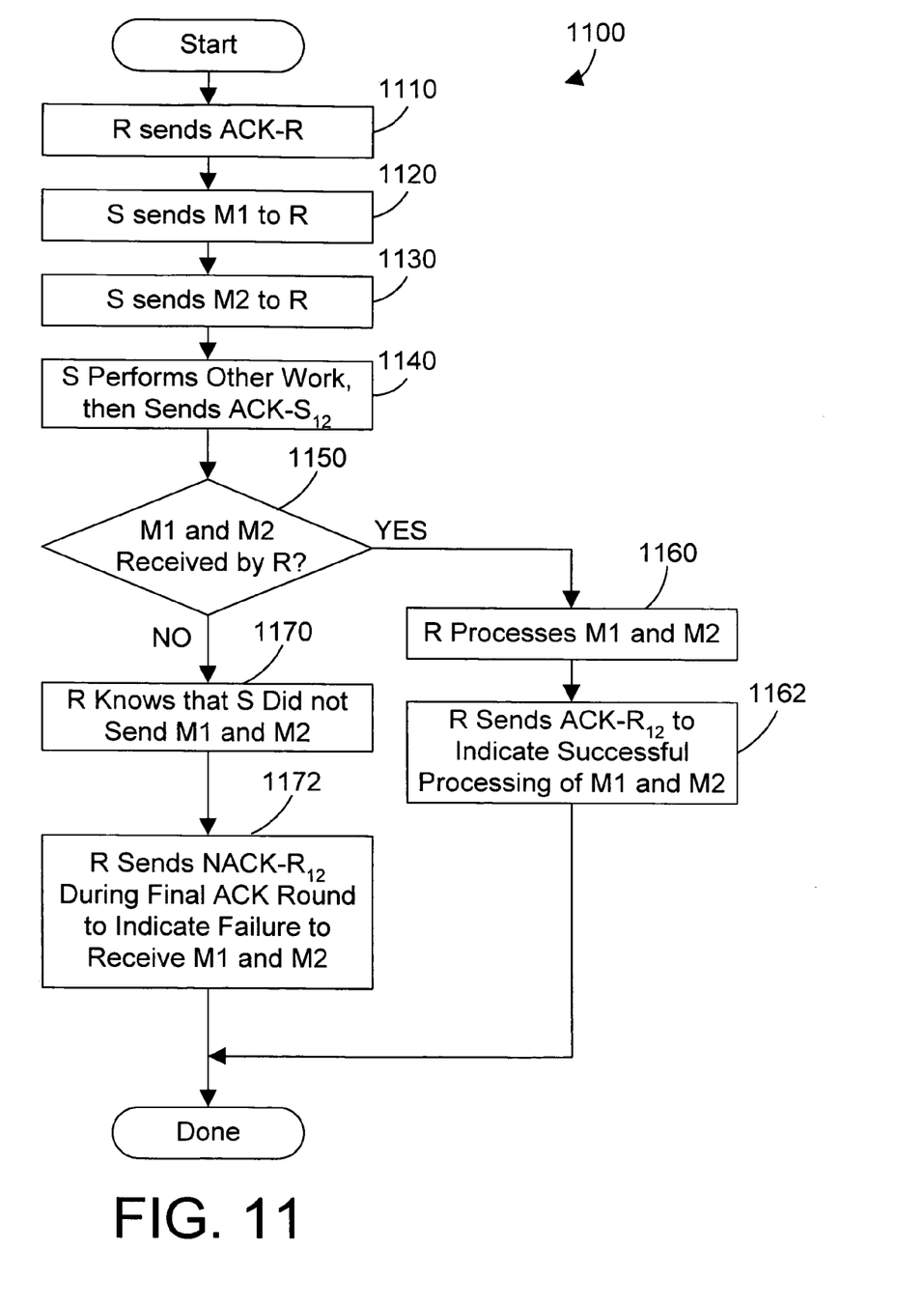
FIG. 11 is a flow diagram of a method in accordance with the preferred embodiments for processing the protocol of FIG. 9 in the post-ACK case.

The preferred embodiments include two specific examples, referred to herein as the post-ACK case and the pre-ACK case. One suitable example for illustrating the post-ACK case is shown in FIGS. 9–11. Referring to FIG. 9, a sample protocol 850B includes a data message M1, a data message M2, and an ACK round for the two data messages, labeled ACK-$S_{12}$, and a separate ACK round to indicate successful processing of the two data messages, labeled ACK-$R_{12}$. This case is called the "post-ACK" case because the receiver checks for receipt of the data messages after the ACK for those messages (e.g., ACK-$S_{12}$) occurs.

A timeline for processing the post-ACK protocol 850B of FIG. 9 is shown in FIG. 10. The receiver node, designated Node R, sends an ACK-R message. Note that protocol 850B of FIG. 9 does not contain an explicit ACK-R message. The ACK-R message in FIG. 10 is an ACK message that satisfies the ACK-$S_{12}$ message, which the sender issues later in the example of FIG. 10. The sender node, designated Node S, sends message M1. We assume that the sender then receives the ACK-R message. Meanwhile, the receiver receives the M1 data message. The sender then sends the M2 data message, which is subsequently received by the receiver. The sender then sends the ACK-$S_{12}$ message, which is subsequently received by the receiver. Because both sender and receiver have generated ACK messages (ACK-R for the receiver, and ACK-$S_{12}$ for the sender), the ACK round for ACK-$S_{12}$ is satisfied. The satisfaction of the ACK round indicates to the receiver that the sender has sent both data messages M1 and M2. Thus, after seeing that the ACK round is satisfied by the ACK-$S_{12}$ message, the receiver checks to see if both M1 and M2 have been received (i.e., are present in an input buffer). If either or both of M1 and M2 have not been received, the receiver can then request that the sender re-send the missing message or messages. In this manner the receiver knows when a sender indicates it has sent a message, and can then affirmatively determine what action to take if the message is missing. Assuming that the messages were properly received, the receiver then processes M1 and M2, and sends the ACK-$R_{12}$ message to indicate that the messages M1 and M2 were successfully processed. Note that the sender would then send a message (not shown in FIG. 10) to satisfy the ACK round initiated by the ACK-$R_{12}$ message.

Note that the timing of the ACK-R message with respect to the sending of M1, M2, and ACK-$S_{12}$ may vary within the scope of the preferred embodiments. Thus, while the timing diagram of FIG. 10 shows ACK-R as occurring before the data messages M1 and M2 are sent, the ordering of these messages may vary while still providing timer-free waiting for ordered messages. For example, the ACK-R message may be sent at any point in processing the protocol. The result is that the run-time ordering of messages may vary, so long as the order of messages from a particular sender node is maintained. Thus, for the protocol 850B of FIG. 9, the ACK-R message may actually be sent by the receiver, or received by the sender, at any point relative to any of the sender messages. Thus, the sender may send data message M1, followed by the receiver sending ACK-R, followed by M2 and ACK-$S_{12}$. Similarly, the sender may send data message M1, then data message M2, followed by the receiver sending ACK-R, followed by ACK-$S_{12}$. ACK-R could even be sent after the ACK-$S_{12}$ message. ACK-R is simply the receiver response that satisfies the ACK-$S_{12}$ message, so the timing of when this message occurs relative to the ACK-$S_{12}$ message is unimportant.

Referring to FIG. 11, a method 1100 illustrates steps that may be performed in the post-ACK case within the scope of the preferred embodiments. Note that in the steps of FIG. 11, S is the sender while R is the receiver. The receiver sends the ACK-R message (step 1110), which is the message from the receiver that will satisfy the ACK-$S_{12}$ message once it is sent by the sender. The sender then sends data message M1 to the receiver (step 1120), followed by sending data message M2 to the receiver (step 1130). The sender may then perform other work, then sends the ACK-$S_{12}$ message (step 1140). Once the receiver sees the ACK-$S_{12}$ message in step 1140, it knows that the sender sent data messages M1 and M2. The receiver then checks to see if data messages M1 and M2 were received (step 1150). One suitable way to check to see if M1 and M2 were received is for the receiver to check its input buffers for messages that have not yet been processed. If messages M1 and M2 were received (step 1150=YES), these messages are processed by the receiver (step 1160). Note that in the post-ACK case, the protocol must have a final ACK round, as shown in protocol 850B of FIG. 9 as ACK-$R_{12}$. This final ACK round is required to indicate whether the messages M1 and M2 were successfully processed in step 1160. Thus, assuming that the receiver successfully processes M1 and M2, the receiver sends the ACK-$R_{12}$ message to initiate the final ACK round that indicates successful processing of M1 and M2. Of course, the sender will then respond with an appropriate ACK message (though not shown in FIG. 11), which will satisfy the pending ACK-$R_{12}$ message, allowing the execution of the protocol to complete.

Figure 12:
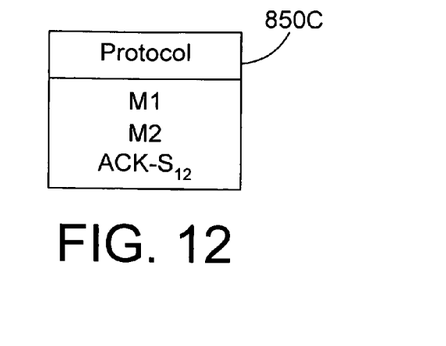
FIG. 12 is a block diagram of a sample protocol that illustrates the pre-ACK embodiment that includes an ACK round (ACK-$S_{12}$) that allows the receiver to receive data messages M1 and M2 without using a timer.
Figure 13:
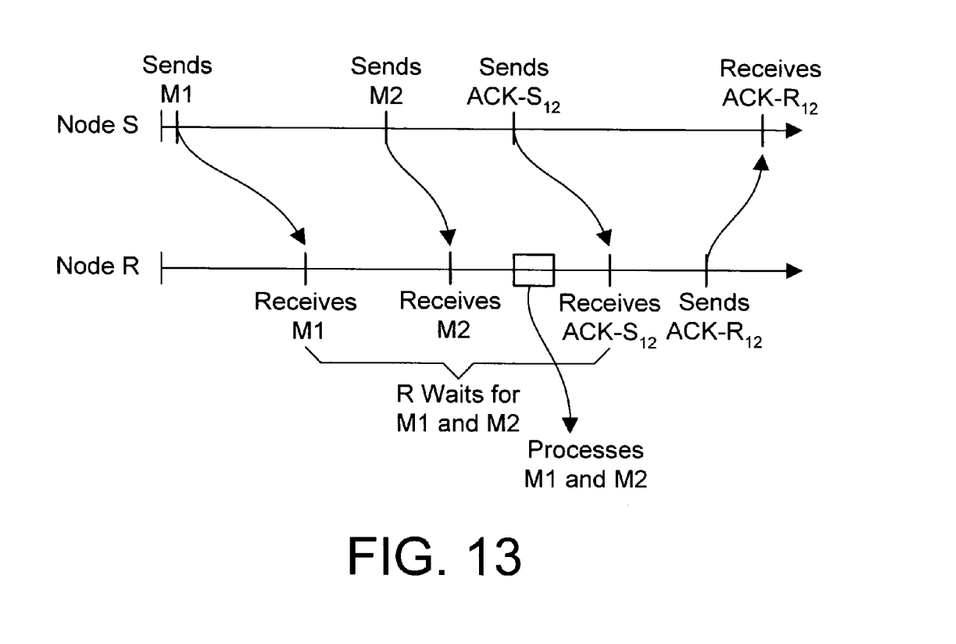
FIG. 13 is a timing diagram showing how the protocol of FIG. 12 is processed in the pre-ACK case in accordance with the preferred embodiments.
Figure 14:
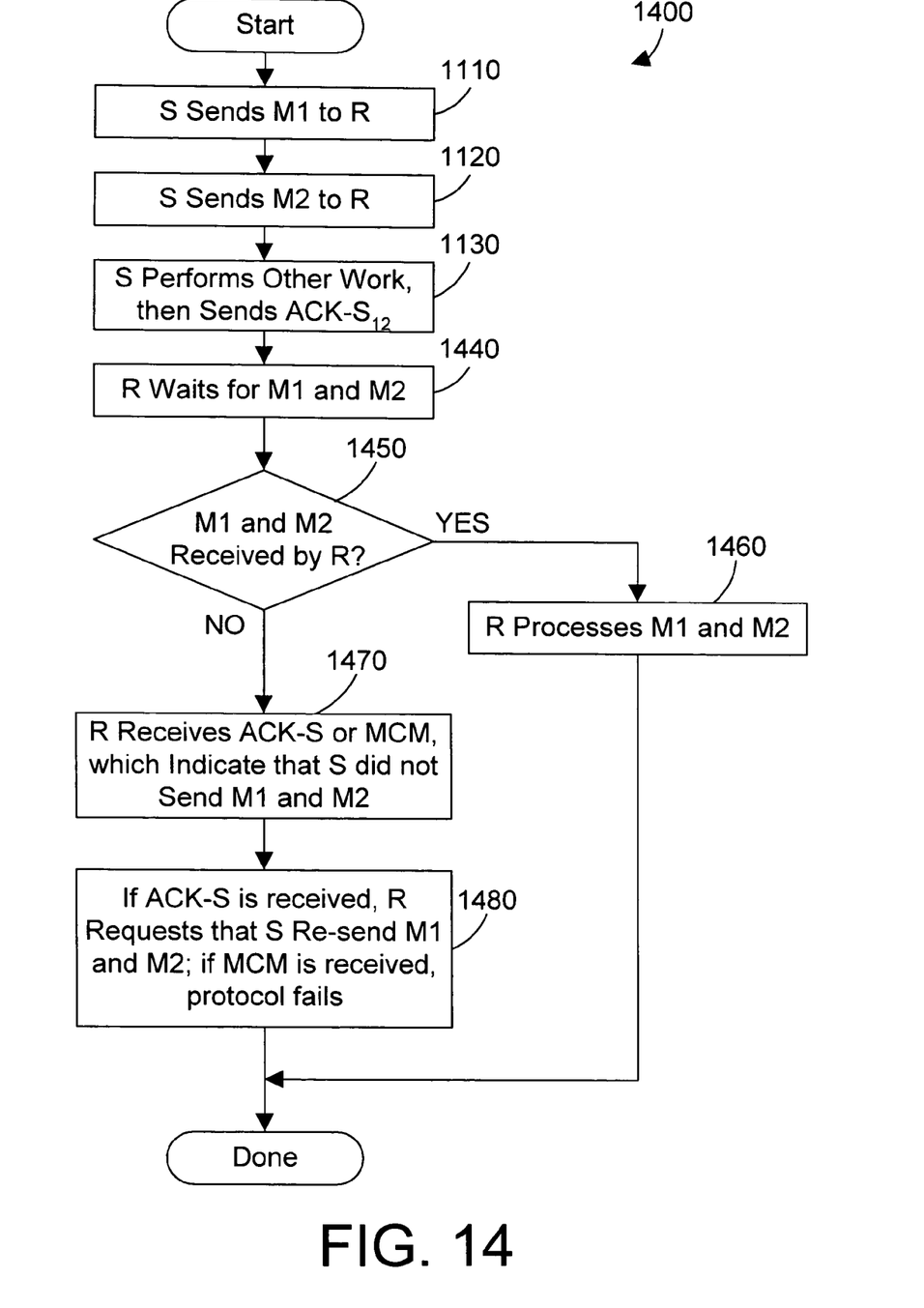
FIG. 14 is a flow diagram of a method in accordance with the preferred embodiments for processing the protocol of FIG. 12 in the pre-ACK case.

One suitable example for illustrating the pre-ACK case is shown in FIGS. 12–14. Referring to FIG. 12, a sample protocol 850C includes a data message M1, a data message M2, and an ACK round for the two data messages, labeled ACK-$S_{12}$. This case is called the "pre-ACK" case because the receiver checks for receipt of the data messages before the ACK for those messages (e.g., ACK-$S_{12}$) occurs.

The timeline of FIG. 13 shows the timing in sending and receiving the messages in FIG. 12. First, the sender node sends data message M1. Subsequently, the receiver node receives the data message M1. Similarly, the sender node sends data message M2, followed by the receiver receiving the data message M2. In the pre-ACK case, the receiver is monitoring for the receipt of the expected data messages before the ACK round for those data messages is received.

Thus, assuming that messages M1 and M2 are received by the receiver, the receiver can then process these messages M1 and M2. The sender sends the ACK-$S_{12}$ message only after the sending the data messages M1 and M2, so if the receiver sees the ACK-$S_{12}$ and the data message have not been received, the receiver knows that the messages are not going to come.

Once the receiver has processed M1 and M2, it sends an ACK-$R_{12}$ message, which indicates both successful receipt and processing of data messages M1 and M2. Note that this is different than the ACK-R message send in the post-ACK case shown in FIG. 10, which simply satisfies the ACK round for the ACK-$S_{12}$ message sent by the sender. This is the reason that the pre-ACK case does not require a separate ACK round at the end of the protocol, as does the post-ACK case. In the post-ACK case, the ACK-R message acknowledges that messages M1 and M2 should have been received, while the successful processing of those messages is indicated in the separate ACK round initiated by the ACK-$R_{12}$ message. In the pre-ACK case, the successful receipt and processing of the messages is indicated in the ACK-$R_{12}$ message that is sent by the receiver to satisfy the ACK round initiated by the ACK-$S_{12}$ message, and therefore no extra ACK round is required in the pre-ACK case. Note, however, that the pre-ACK case requires that the receiver know who the sender is so that it can tell which ACK message indicates that no more data messages will be sent from the sender. If the sender is unknown, the post-ACK case must be used.

Referring to FIG. 14, a method 1400 for the pre-ACK case in accordance with the preferred embodiments begins by the sender sending data message M1 (step 1110), sending M2 (step 1120), and performing other work, then sending ACK-$S_{12}$ (step 1130). Note that these three steps are the same performed in the post-ACK case discussed in reference to FIG. 11. However, instead of the receiver sending an ACK-R message and waiting until the ACK-$S_{12}$ round is satisfied, the receiver monitors for receipt of the expected data messages M1 and M2. If both M1 and M2 are received (step 1450=YES), the receiver processes M1 and M2 (step 1460). While the receiver is awaiting M1 and M2, one of three messages may be received. First, the data message itself may be received. Second, the ACK-$S_{12}$ message may be received. Third, a membership change message (MCM) may be received. Of course, the receipt of the data message indicates proper operation. Receipt of the ACK-$S_{12}$ message before both data messages indicates an error, because the ACK-$S_{12}$ message indicates that both data messages have been sent. Receipt of a membership change message also indicates an error. A membership change message is typically sent when the sender has a failure, causing it to withdraw from the group by issuing the membership change message. If the receiver is awaiting receipt of M1 and/or M2, and receives the ACK-$S_{12}$ message or a membership change message (MCM) (step 1470), the receiver knows that the expected message will never come due to the error indicated by one of these messages. If the message in step 1470 was an ACK-$S_{12}$ message, the receiver can then request that the sender re-send M1 and M2; if the message in step 1470 was a membership change message, the protocol fails (step 1480).

Figure 15:
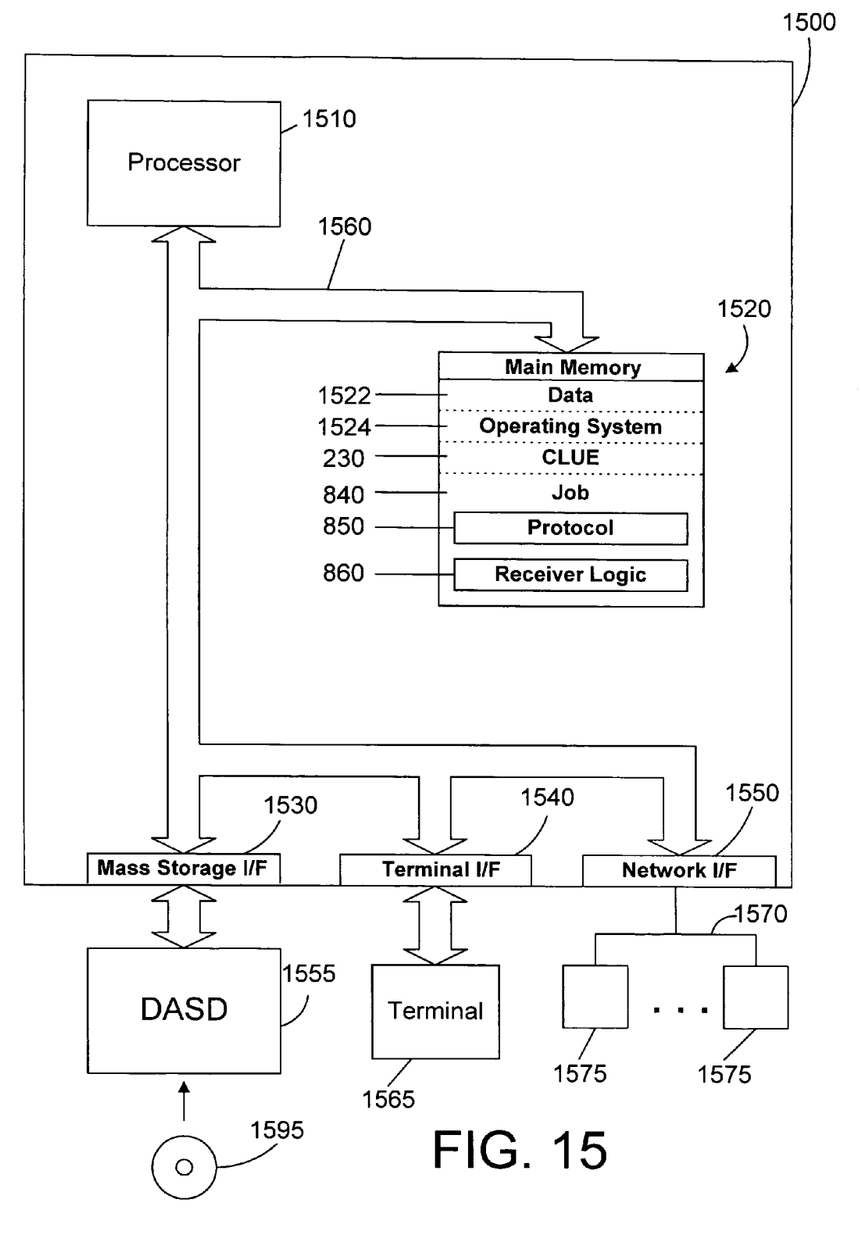
FIG. 15 is a block diagram of a node that may be used in a computer cluster in accordance with the preferred embodiments.

Referring now to FIG. 15, a computer system 1500 is an enhanced IBM iSeries 400 computer system, and represents one suitable type of node 110 (FIG. 1) that can be networked together in accordance with the preferred embodiments. Those skilled in the art will appreciate that the mechanisms and apparatus of the present invention apply equally to any computer system that can be networked together with other computer systems. As shown in FIG. 15, computer system 1500 comprises a processor 1510 connected to a main memory 1520, a mass storage interface 1530, a terminal interface 1540, and a network interface 1550. These system components are interconnected through the use of a system bus 1560. Mass storage interface 1530 is used to connect mass storage devices (such as a direct access storage device 1555) to computer system 1500. One specific type of direct access storage device 1555 is a read/write CD-ROM drive, which may store data to and read data from a CD-ROM 1595.

Main memory 1520 contains data 1522, an operating system 1524, a cluster engine (CLUE) 230, and one or more jobs 840 that each process a protocol 850 and receiver logic 860. Data 1522 represents any data that serves as input to or output from any program in computer system 1500. Operating system 1524 is a multitasking operating system known in the industry as OS/400; however, those skilled in the art will appreciate that the spirit and scope of the present invention is not limited to any one operating system. CLUE 230 is a cluster engine that communicates with other computer systems in a defined cluster. In the preferred embodiments, CLUE 230 enforces ordered messages, which means that each member in the cluster will see messages from a sender in the same order. In the preferred embodiments, CLUE 230 is a known cluster engine with functions as described above. However, it is equally within the scope of the present invention to provide a cluster engine 230 that has new or different attributes when compared to known cluster engines.

A job 840 can be a member of a group on a cluster that executes a defined protocol 850. Each protocol 850 is defined to have an ACK round at the end of each phase, and is defined so that no node can both receive a data message and send a data message during the same phase of the protocol (as discussed in step 710 of FIG. 7). Job 840 also processes receiver logic 860 that determines how the job receives messages from CLUE 230. As discussed above, receiver logic 860 uses ACK rounds instead of timers to determine when data messages should have been received. Receiver logic 860 may operate in a post-ACK mode or in a pre-ACK mode, depending on whether the protocol has an additional ACK round at the end (which is required by the post-ACK case) and depending on whether the receiver knows which node will be sending an expected message (which is required by the pre-ACK case). While receiver logic 860 is shown to be separate from protocol 850, it is equally within the scope of the preferred embodiments to provide receiver logic 860 as in integral part of protocol 850. The combination of protocol 850 and receiver logic 860 provide the functions discussed herein with respect to the preferred embodiments.

Computer system 1500 utilizes well known virtual addressing mechanisms that allow the programs of computer system 1500 to behave as if they only have access to a large, single storage entity instead of access to multiple, smaller storage entities such as main memory 1520 and DASD device 1555. Therefore, while data 1522, operating system 1524, CLUE 230, and jobs 240 are shown to reside in main memory 1520, those skilled in the art will recognize that these items are not necessarily all completely contained in main memory 1520 at the same time. It should also be noted that the term "memory" is used herein to generically refer to the entire virtual memory of computer system 1500.

Processor 1510 may be constructed from one or more microprocessors and/or integrated circuits. Processor 1510 executes program instructions stored in main memory 1520.

Main memory 1520 stores programs and data that processor 1510 may access. When computer system 1500 starts up, processor 1510 initially executes the program instructions that make up operating system 1524. Operating system 1524 is a sophisticated program that manages the resources of computer system 1500. Some of these resources are processor 1510, main memory 1520, mass storage interface 1530, terminal interface 1540, network interface 1550, and system bus 1560.

Although computer system 1500 is shown to contain only a single processor and a single system bus, those skilled in the art will appreciate that the present invention may be practiced using a computer system that has multiple processors and/or multiple buses. In addition, the interfaces (called input/output processors in iSeries terminology) that are used in the preferred embodiment each include separate, fully programmed microprocessors that are used to off-load compute-intensive processing from processor 1510. However, those skilled in the art will appreciate that the present invention applies equally to computer systems that simply use I/O adapters to perform similar functions.

Terminal interface 1540 is used to directly connect one or more terminals 1565 to computer system 1500. These terminals 1565, which may be non-intelligent (i.e., dumb) terminals or fully programmable workstations, are used to allow system administrators and users to communicate with computer system 1500. Note, however, that while terminal interface 1540 is provided to support communication with one or more terminals 1565, computer system 1500 does not necessarily require a terminal 1565, because all needed interaction with users and other processes may occur via network interface 1550.

Network interface 1550 is used to connect other computer systems and/or workstations (e.g., 1575 in FIG. 15) to computer system 1500 across a network 1570. Network 1570 represents the logical connections between computer system 1500 and other computer systems on the network 1570. The present invention applies equally no matter how computer system 1500 may be connected to other computer systems and/or workstations, regardless of whether the network connection 1570 is made using present-day analog and/or digital techniques or via some networking mechanism of the future. In addition, many different network protocols can be used to implement a network. These protocols are specialized computer programs that allow computers to communicate across network 1570. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 1595 of FIG. 15), and transmission type media such as digital and analog communications links.

The present invention as described with reference to the preferred embodiments herein provides significant improvements over the prior art. By defining a protocol and receiver logic in a particular way, the receiver can receive messages without using timers. The protocol is defined in a particular way by ending each phase of the protocol with an ACK round, and by assuring that no node both sends and receives a data message during any phase of the protocol. In addition, for the post-ACK case, the protocol ends with an additional ACK round. This preferred embodiments allow much greater flexibility in configuring computer clusters that include nodes over a wide area network (WAN) whose response times may vary greatly with network load.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

I claim:

1. An apparatus comprising:
   at least one processor;
   a memory coupled to the at least one processor;
   a cluster engine residing in the memory and executed by the at least one processor, the cluster engine providing a mechanism for communicating ordered messages to and from a plurality of nodes in a computer cluster, wherein the apparatus comprises one node in the computer cluster;
   a protocol residing in the memory that specifies at least one data message and at least one acknowledge (ACK) round that provides a time benchmark for determining whether or not a message has been received without using any timer; and
   a job residing in the memory and executed by the at least one processor, the job processing the protocol, wherein the job functions according to receiver logic that uses the at least one ACK round to determine without using any timer whether the at least one data message has been received.

2. The apparatus of claim 1 wherein the protocol comprises a plurality of phases that are each followed by an acknowledge (ACK) round.

3. The apparatus of claim 2 wherein each phase of the protocol is defined so that no node can both send a data message and receive a data message during any phase of the protocol.

4. The apparatus of claim 1 wherein the receiver logic comprises post-ACK logic that determines whether the at least one data message has been received after the job processes a selected one of the at least one ACK rounds.

5. The apparatus of claim 1 wherein the receiver logic comprises pre-ACK logic that determines whether the at least one data message has been received before the job processes a selected one of the at least one ACK rounds.

6. A networked computer system comprising:
   a cluster of computer systems that each includes:
      a network interface that couples each computer system via a network to other computer systems in the cluster;
      a memory;
      a cluster engine residing in the memory that provides a mechanism for communicating ordered messages to and from the computer systems in the cluster;
      a protocol residing in the memory that specifies at least one data message and at least one acknowledge (ACK) round that provides a time benchmark for determining whether or not a message has been received; and
      a job residing in the memory and processing the protocol, wherein the job functions according to receiver logic that uses the at least one ACK round to determine without using any timer whether the at least one data message has been received.

7. The networked computer system of claim 6 wherein the protocol comprises a plurality of phases that are each followed by an acknowledge (ACK) round.

8. The networked computer system of claim 7 wherein each phase of the protocol is defined so that no node can both send a data message and receive a data message during any phase of the protocol.

9. The networked computer system of claim 6 wherein the receiver logic comprises post-ACK logic that determines whether the at least one data message has been received after the job processes a selected one of the at least one ACK rounds.

10. The networked computer system of claim 6 wherein the receiver logic comprises pre-ACK logic that determines whether the at least one data message has been received before the job processes a selected one of the at least one ACK rounds.

11. A computer-implemented method for processing a protocol using a plurality of jobs that form a group in a clustered computing environment, the method comprising the steps of:
   providing a cluster engine for each member of the group that communicates with the other cluster engines in the group;
   defining the protocol so that non-receipt of a message by the cluster engine can be determined without using any timer, the protocol including at least one data message and at least one acknowledge (ACK) round that provides a time benchmark for determining whether or not a message has been received; and
   a job processing the protocol and functioning according to receiver logic that uses the at least one ACK round to determine without using any timer whether the at least one data message has been received.

12. The method of claim 11 wherein the step of defining the protocol further comprises the step of defining a plurality of phases that are each followed by an ACK round.

13. The method of claim 12 wherein the step of defining the protocol further comprises the step of defining each phase of the protocol so that no node can both send a data message and receive a data message during any phase of the protocol.

14. The method of claim 11 further comprising the step of the job using post-ACK logic that determines whether the at least one data message has been received after the job processes a selected one of the at least one ACK rounds.

15. The method of claim 11 further comprising the step of the job using pre-ACK logic that determines whether the at least one data message has been received before the job processes a selected one of the at least one ACK rounds.

16. A program product comprising:
   (A) a protocol that specifies at least one data message and at least one acknowledge (ACK) round that provides a time benchmark for determining whether or not a message has been received without using any timer;
   (B) a job that processes the protocol, wherein the job functions according to receiver logic that uses the at least one ACK round to determine without using any timer whether the at least one data message has been received; and
   (C) computer-readable signal bearing media bearing the protocol and the job.

17. The program product of claim 16 wherein the protocol comprises a plurality of phases that are each followed by an acknowledge (ACK) round.

18. The program product of claim 17 wherein each phase of the protocol is defined so that no node can both send a data message and receive a data message during any phase of the protocol.

19. The program product of claim 16 wherein the receiver logic comprises post-ACK logic that determines whether the at least one data message has been received after the job processes a selected one of the at least one ACK rounds.

20. The program product of claim 16 wherein the receiver logic comprises pre-ACK logic that determines whether the at least one data message has been received before the job processes a selected one of the at least one ACK rounds.

* * * * *